(12) United States Patent
Sasidharan et al.

(10) Patent No.: US 9,797,296 B2
(45) Date of Patent: Oct. 24, 2017

(54) PRE-CHAMBER FOR INTERNAL COMBUSTION ENGINE

(71) Applicant: Cummins Inc., Columbus, IN (US)

(72) Inventors: Premjee Sasidharan, Columbus, IN (US); Leon A. LaPointe, Columbus, IN (US)

(73) Assignee: Cummins Inc., Columbus, IN (US)

( * ) Notice: Subject to any disclaimer, the term of this patent is extended or adjusted under 35 U.S.C. 154(b) by 667 days.

(21) Appl. No.: 13/841,866

(22) Filed: Mar. 15, 2013

(65) Prior Publication Data

US 2014/0261298 A1    Sep. 18, 2014

(51) Int. Cl.

| | | |
|---|---|---|
| *F02B 19/14* | (2006.01) | |
| *F02B 19/18* | (2006.01) | |
| *F02B 19/12* | (2006.01) | |
| F02B 21/00 | (2006.01) | |
| F02B 19/16 | (2006.01) | |
| F02B 3/06 | (2006.01) | |
| F02B 1/04 | (2006.01) | |
| F02B 19/10 | (2006.01) | |
| F02M 61/18 | (2006.01) | |

(52) U.S. Cl.
CPC .......... *F02B 19/18* (2013.01); *F02B 19/1014* (2013.01); *F02B 19/1019* (2013.01); *F02B 19/12* (2013.01); *F02B 1/04* (2013.01); *F02B 3/06* (2013.01); *F02B 19/108* (2013.01); *F02B 19/14* (2013.01); *F02B 19/16* (2013.01); *F02B 21/00* (2013.01); *F02M 61/1833* (2013.01); *Y02T 10/125* (2013.01)

(58) Field of Classification Search
CPC .... F02B 19/14; F02B 3/06; F02B 1/04; F02B 19/108; F02B 21/00

USPC .......................................................... 123/275
See application file for complete search history.

(56) References Cited

U.S. PATENT DOCUMENTS

| | | |
|---|---|---|
| 4,040,393 A | 8/1977 | Decker et al. |
| 4,144,848 A | 3/1979 | Hatanaka et al. |
| 4,182,286 A | 1/1980 | Yagi et al. |
| 5,024,193 A | 6/1991 | Graze, Jr. |
| 5,405,280 A | 4/1995 | Polikarpus et al. |
| 6,854,439 B2 | 2/2005 | Regueiro |
| 7,922,551 B2 | 4/2011 | Tozzi |

(Continued)

FOREIGN PATENT DOCUMENTS

| | | | |
|---|---|---|---|
| DE | 10 2011 076 471 | 2/2016 | |
| EP | 0471933 A1 * | 2/1992 | ............. F02B 19/14 |

(Continued)

OTHER PUBLICATIONS

Extended European Search Report issued in EP Application No. 14768737.0, dated Sep. 30, 2016.

*Primary Examiner* — Jacob Amick
*Assistant Examiner* — Charles Brauch
(74) *Attorney, Agent, or Firm* — Foley & Lardner LLP

(57) ABSTRACT

Described herein is a combustion pre-chamber apparatus for a main combustion chamber of an internal combustion engine that includes a body that defines an internal combustion cavity. The apparatus also includes at least one orifice that extends through the body. The at least one orifice includes a first end open to the internal combustion cavity and a second end open to the main combustion chamber. The first end is bigger than the second end.

14 Claims, 3 Drawing Sheets

(56) References Cited

U.S. PATENT DOCUMENTS

| | | | |
|---|---|---|---|
| 7,950,364 B2 | 5/2011 | Nerheim | |
| 2004/0237929 A1* | 12/2004 | Cavanagh | F02M 61/1826 123/299 |
| 2011/0030635 A1* | 2/2011 | Siuchta | F02M 57/025 123/1 A |
| 2013/0000598 A1* | 1/2013 | Tokuoka | F02B 19/1023 123/254 |

FOREIGN PATENT DOCUMENTS

| | | | |
|---|---|---|---|
| EP | 1701419 A1 | 9/2006 | |
| EP | 2 009 276 | 12/2008 | |
| EP | 2 520 780 | 11/2012 | |
| JP | 2006-177248 | 7/2006 | |
| WO | WO-98/45588 | 10/1998 | |
| WO | WO 2011080917 A1 * | 7/2011 | ......... F02B 19/1023 |
| WO | WO-2014/094808 | 6/2014 | |

\* cited by examiner

PRE-CHAMBER FOR INTERNAL COMBUSTION ENGINE

FIELD

The subject matter of this application relates generally to internal combustion engines, and more specifically to fuel ignition systems of internal combustion engines.

BACKGROUND

Internal combustion engines known in the art include various combustion chamber configurations. Some combustion chamber configurations include passive pre-chamber and fuel fed pre-chamber configurations. Pre-chamber configurations are particularly useful for initiating and propagating the combustion flame for lean-burn natural gas engines. Some alternative fuels, such as natural gas, can be difficult to ignite using conventional open chamber type combustion chamber configurations. Some pre-chambers make it is possible to run the engine at much leaner air-to-fuel ratios enabling the engine to meet lower emissions more fuel efficiently. But with ever increasing power density targets, it becomes a challenge to meet these requirements at acceptable combustion stability.

Pre-chambers include a combustion volume in which a spark plug is located. The combustion volume of the pre-chamber is linked to a main combustion chamber by the use of one or more orifices. The spark plug initiates a combustion event by generating a spark (e.g., electron current). More specifically, the spark from the spark plug initiates a flame that propagates through the pre-chamber volume. This combustion creates a sudden increase in pressure in the pre-chamber creating a large pressure difference across the orifices between the pre-chamber and main chamber. The pressure difference forces the flame to propel through the orifices into the main combustion chamber resulting in a successful combustion event.

After a successful combustion event, the residual exhaust gases in the main chamber are scavenged during the exhaust stroke. During a subsequent intake stroke, fresh air and fuel are introduced into the main chamber via a compression event driven by a piston. During the subsequent compression stroke, the pressure difference between the main chamber and pre-chamber increases forcing the air and fuel through the orifices into the pre-chamber. In alternative configurations, fresh air may be introduced directly into the pre-chamber during the intake stroke and/or fuel may be injected into the pre-chamber during the intake stroke and/or subsequent compression stroke.

SUMMARY

The subject matter of the present application has been developed in response to the present state of the art, and in particular, in response to the problems and needs in the combustion chamber art that have not yet been fully solved by currently available combustion chambers. Generally, the present application describes various embodiments of a pre-chamber apparatus, system, and method that overcome many of the shortcomings of the prior art.

According to one embodiment, a combustion pre-chamber apparatus for a main combustion chamber of an internal combustion engine includes a body that defines an internal combustion cavity. The apparatus also includes at least one orifice that extends through the body. The at least one orifice includes a first end open to the internal combustion cavity and a second end open to the main combustion chamber. The first end is bigger than the second end.

In some implementations of the combustion pre-chamber apparatus, the orifice has a conical-frustum shape. The orifice of the apparatus can converge from the first end to the second end. A ratio of a cross-sectional area of the second end to a cross-sectional area of the first end can be between about 0.5 and about 0.95. A cross-sectional area of the at least one orifice can decrease (e.g., at a constant rate or uniformly) in a direction extending from the first end to the second end. The orifice can have a substantially circular cross-sectional shape. The orifice can be one of a plurality of similar configured orifices.

According to certain implementations, the apparatus includes a fillet at a transition between the second end of the at least one orifice and the body. The fillet can have a radius. A ratio of the radius of the fillet and a diameter of the second end of the at least one orifice is between about 0.01 and about 0.2. In some implementations, the apparatus also includes a second fillet at a transition between the second end of the at least one orifice and the body. A ratio of a radius of the first fillet to a radius of the second fillet is between about 0.05 and 0.85.

In certain implementations of the apparatus, a transition between the second end of the at least one orifice and the body has an annular-shaped curved surface. In yet some implementations, a transition between the first end of the at least one orifice and the body has an annular-shaped curved surface. A transition between the first end of the at least one orifice and the body can have a relatively sharp edge, and the transition between the second end of the at least one orifice and the body can have a relatively smooth edge.

According to some implementations of the apparatus, the first end has first discharge coefficient and the second end has a second discharge coefficient. The first discharge coefficient is different than the second discharge coefficient. The first discharge coefficient can be smaller than the second discharge coefficient.

In another embodiment, an internal combustion engine includes a block that defines a main combustion cylinder and a cylinder head coupled to the block above the main combustion cylinder. The cylinder head includes a combustion pre-chamber. The cylinder head further includes a plurality of orifices fluidly coupling the main combustion cylinder and the combustion pre-chamber. Each of the plurality of orifices converge from the combustion pre-chamber to the main combustion cylinder. The engine further includes a spark plug at least partially positioned within the combustion pre-chamber.

According to some implementations of the engine, the cylinder head includes at least one of a radiused fillet at an intersection between the orifice and the main combustion cylinder or a radiused fillet at an intersection between the orifice and the combustion pre-chamber. The engine may include a fuel and air mixture source in fluid communication with the main combustion cylinder, and a piston that is movable within the main combustion cylinder. During a compression stroke of the piston, a fuel and air mixture within the main combustion cylinder is driven into the combustion pre-chamber via the plurality of orifices. The engine can include a fuel injector in fuel injecting communication directly with the combustion pre-chamber.

In yet another embodiment, an internal combustion engine includes a first combustion chamber, a second combustion chamber, and a plurality of converging orifices that extend from the first combustion chamber to the second combustion chamber.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
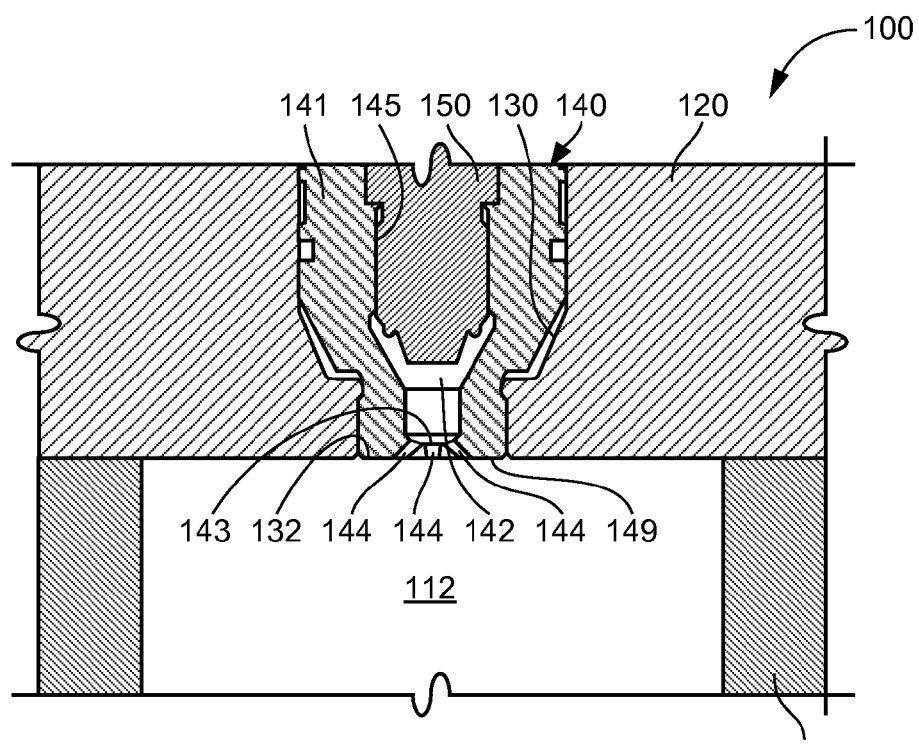
FIG. 1 is a cross-sectional side view of an internal combustion engine having a passive pre-chamber apparatus with a plurality of conically-shaped orifices between a combustion pre-chamber and a main combustion chamber according to one embodiment.

As shown in FIG. 1, one embodiment of an internal combustion engine 100 includes a pre-chamber apparatus 140. The engine 100 can be any of various types of internal combustion engines (e.g., compression-ignited and spark-ignited) powered by any of various types of fuels, such as diesel, gasoline, or alternative fuels (e.g., natural gas).

Like most conventional engines, the engine 100 includes a block 110 that defines a cylinder or main combustion chamber 112. Typically, the main combustion chamber 112 is a generally cylindrically-shaped volume. Although not shown, the main combustion chamber 112 can be in fuel receiving communication with a fuel source, and air receiving communication with an air source. The air and fuel from the respective sources may be premixed prior to being communicated into the main combustion chamber 112. Alternatively, the air and fuel may be independently communicated into the main combustion chamber 112 where the air and fuel mixes prior to combustion.

The engine 100 also includes a cylinder head 120 mounted over and secured to the block 110. The cylinder head 120 defines a recess 130 positioned over the main combustion chamber 112 of the block 110. The recess 130 includes an opening 132 that is open to the main combustion chamber 112 In the illustrated embodiment, the recess 130 is configured to receive and secure the pre-chamber apparatus 140 to the cylinder head 120 over the main combustion chamber 112. In some implementations, although other coupling configurations are possible, the recess 130 includes internal threads and the pre-chamber apparatus 140 includes external threads that engage the internal threads of the recess to secure the pre-chamber apparatus within the recess. Accordingly, in some implementations, the pre-chamber apparatus 140 can be removably secured to the cylinder head 120. Although not shown, the engine 100 may include a gasket positioned between the cylinder head 110 and block 120 to promote a seal between the cylinder head and block.

The pre-chamber apparatus 140 includes a body 141 that defines a combustion pre-chamber 142. An exterior of the body 141 is configured to engage the recess 130 of the cylinder head 120. The exterior of the body 141 may also include sealing elements that promote a seal between the body and the cylinder head 120. The combustion pre-chamber 142 is an internal volume contained within the body 141. The combustion pre-chamber 142 can have any of various shapes and sizes as desired. In certain implementations, the combustion pre-chamber 142 is sized to surround a spark-generating portion of a spark plug 150, and may converge gradually or iteratively to a bottom surface 143 of the pre-chamber.

The body 141 of the pre-chamber apparatus 140 also defines a spark plug receptacle 145 configured to engage and secure the spark plug 150. The receptacle 145 secures the spark plug 150 in place away from the main combustion chamber 112 to effectively spatially separate the spark plug from the main combustion chamber. Further, the receptacle 145 of the body 141 receives and retains the spark plug 150 within the body such that cathode and anode electrodes of the spark plug are positioned within the pre-chamber 142. The receptacle 145 and spark plug 150 may each include corresponding engagement elements, such as threads, to facilitate a secure (and in some instances, removable) coupling between the receptacle and spark plug. The spark plug 150 can be any of the various spark plugs known in the art.

The body 141 also defines one or more orifices or nozzles 144 that fluidly connect the combustion pre-chamber 142 with the main combustion chamber 112. The orifices 144 extend from a pre-chamber end or opening open to the pre-chamber 142 to a main combustion chamber end or opening open to the main combustion chamber 112. The pre-chamber ends are at least partially formed in the bottom surface 142 of the combustion pre-chamber 142. The main combustion chamber ends are formed in a bottom end surface 149 of the body 141. Generally, the orifices 144 define fluid flow channels. The orifices 144 converge from the pre-chamber end to the main combustion chamber end to define a substantially conically or frusto-conically shaped orifice or fluid flow channel.

Although the body 141 of the pre-chamber apparatus 140 is shown as a separately and discretely formed element coupled to a receptacle in the cylinder head 120, in other embodiments, the body, including the combustion pre-chamber 142 and orifices 144, can be integrated into (e.g., formed as a one-piece monolithic construction with) the cylinder head 120. Also, with fuel being introduced first into the main combustion chamber 112, and supplied to the combustion pre-chamber 142 via a compression stroke of a piston of the engine 100 as will be explained in more detail below, the pre-chamber apparatus 140 is defined as a passive pre-chamber apparatus. Alternatively, as shown in FIG. 2, because fuel is directly fed into the pre-chamber apparatus 240 of the internal combustion engine 200, the pre-chamber apparatus 240 is defined as a fuel-fed pre-chamber apparatus.

Figure 2:
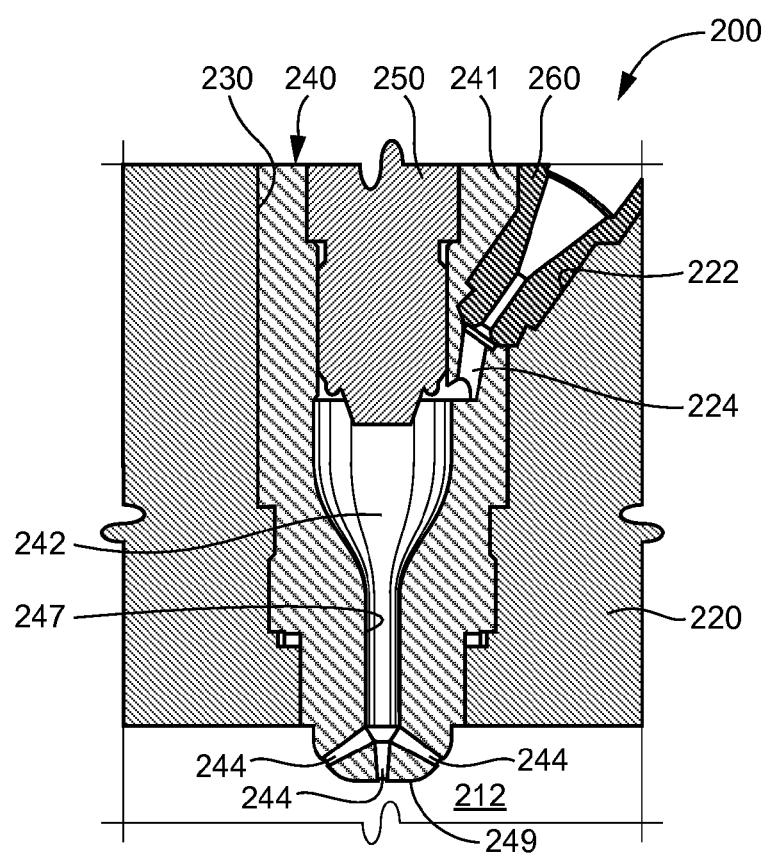
FIG. 2 is a cross-sectional side view of an internal combustion engine having a fuel fed pre-chamber apparatus with a plurality of conically-shaped orifices between a combustion pre-chamber and a main combustion chamber according to one embodiment.

The internal combustion engine 200 with fuel-fed pre-chamber apparatus 240 of FIG. 2 is similar to the internal combustion engine 100 with passive pre-chamber apparatus 140 of FIG. 1, with like numbers referring to like features. Accordingly, only dissimilar features between the engines 100, 200 will be emphasized with the above descriptions being sufficient to describe the similar features. The cylinder head 220 of the engine 200 includes a fuel injector receptacle 222 configured to receive a fuel injector 260. The cylinder head 220 also includes a fuel supply line 224 fluid coupled with the combustion pre-chamber 242. When actuated, fuel is injected from the fuel injector 260 into the pre-chamber 242 via the fuel supply line 224. The pre-chamber 242 may receive air from the main combustion chamber 212 via a compression stroke of a piston or air can be provided directly into the pre-chamber 242 via an air supply line (not shown). The bottom end surface 249 of the pre-chamber body 241 may extend beyond a bottom surface of the cylinder head 120 into the main combustion chamber 212, as opposed to being mounted substantially flush with the bottom surface of the cylinder head as with the pre-chamber body 141. The pre-chamber 242 of the apparatus 240 can be longer than the pre-chamber 142 with an elongate neck portion 241 that terminates at approximately the pre-chamber ends of the plurality of orifices 244.

Figure 3:
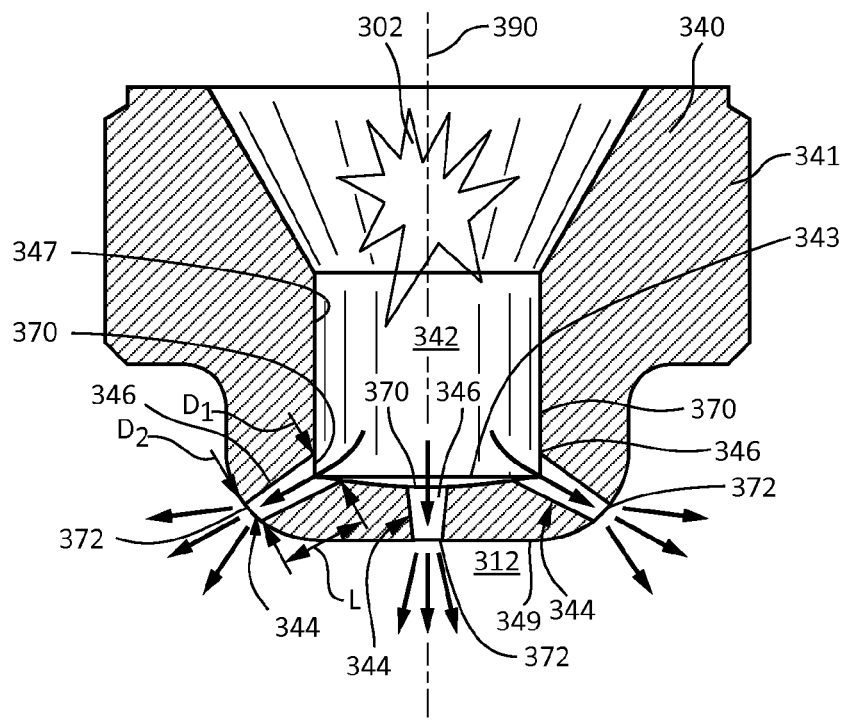
FIG. 3 is a cross-sectional side view of one embodiment of a pre-chamber apparatus with a plurality of conically-shaped orifices between a combustion pre-chamber and a main combustion chamber showing combustion gases passing from the combustion pre-chamber to the main combustion chamber through the plurality of conically-shaped orifices.

Referring to FIG. 3, one embodiment of a pre-chamber apparatus 340 includes a plurality of orifices 344 each having a substantially conical or frusto-conical shape. The pre-chamber apparatus 340 includes a body 341 that defines a combustion pre-chamber 342. The combustion pre-chamber 342 is defined by bottom surface 343 and a side surface 347 extending uprightly relative to the bottom surface. The plurality of orifices 344 are formed in the body 341 and extend through the body to fluidly couple the combustion pre-chamber 342 and a main combustion chamber 312 adjacent the body. Respective interior surfaces 346 of the orifices 344 define fluid flow channels through which fluid (e.g., air, fuel, combustion constituents, etc.) is flowable. In the illustrated implementations, the interior surface 346 of each orifice 344 is substantially smooth and substantially straight along in a fluid flow direction (as indicated by directional arrows) through the orifices. The interior surfaces 346 are substantially straight along an entire length of the orifices 344 or a significant portion of the length of the orifices. However, the interior surface 346 of each orifice 344 may be substantially curved, or undulated, in the fluid flow direction as desired.

Each orifice 344 extends a length L from a first open end 370 to a second open end 372. The first open end 370 is open to the combustion pre-chamber 342 and the second open end 372 is open to the main combustion chamber 312. Accordingly, the first open end 370 is formed in an interior surface defining the pre-chamber 342. As shown, the first open end 370 of some of the orifices 344 (e.g., side orifices) are formed in both the bottom surface 343 and side surface 347 of the pre-chamber 342 at an intersection of the bottom and side surfaces. Also shown, the first open end 370 of one orifice 344 (e.g., a central orifice) is formed in just the bottom surface 343 of the orifice. Some of the orifices 344 (e.g., side orifices) can be angled such that a central axis of the orifices form an angle with a central axis 390 of the pre-chamber 342. In some implementations, the angle can be between 0-degrees and about 90-degrees. As shown, the angle is about 75-degrees. Other orifices 344 (e.g., a central orifice) is oriented such that its central axis is coaxial, or at least parallel, to the central axis 390 of the pre-chamber 342.

In the illustrated embodiments, the orifices 344 have a substantially circular cross-sectional shape. Accordingly, the first open end 370 is sized to have a first internal diameter $D_1$ and the second open end 372 is sized to have a second internal diameter $D_2$. The first diameter $D_1$ of the first open end 370 is larger than the second diameter $D_2$ of the second open end 372. Because the area of a circle is proportional its diameter, the cross-sectional area of the first open end 370 also is larger than the cross-sectional area of the second open end 372. In the illustrated embodiment, the entire orifice 344 has a circular cross-sectional shape with a diameter that uniformly decreases (e.g., decreases at a constant rate per unit length) from the first open end 370 to the second open end 372. Due to the converging nature (or diverging nature in the opposite direction) of the orifices 344, each orifice can be defined to have a generally conical shape. Further, and more specifically, due to the flat open ends 370, 372, the orifices 344 each can be defined to have a partially conical, conical-frustum, or frusto-conical shape.

The first diameter $D_1$ of the first open end 370 is larger than the second diameter $D_2$ of the second open end 372 for a reason as will be explained in more detail below. In some embodiments, an open end ratio $D_2/D_1$ of the second diameter to the first diameter is between about 0.5 and about 0.95. In certain implementations, the open end ratio is between about 0.6 and 0.7. In some implementations, the orifices 144 have a combined cross-sectional area that is smaller than the smallest cross-sectional area of the pre-chamber 342.

Referring again to FIG. 3, in operation, a fuel and air mixture within the combustion pre-chamber 342 of the pre-chamber apparatus 340 is ignited by a spark generated from a spark plug to produce an ignition flame 302 within the pre-chamber. The ignition flame 302 quickly expands within the limited volume of the pre-chamber 342, which rapidly increases the pressure within the pre-chamber. The sudden increase in pressure in the pre-chamber 342 creates a large pressure difference across the orifices 344 between the pre-chamber and main combustion chamber 312. The pressure difference forces the flame 302 to propel through the orifices 344 into the main combustion chamber 312 as indicated by directional arrows. Once in the main combustion chamber 312, flame 302 propagates through the main combustion chamber as also indicated by directional arrows to downwardly drive the piston resulting in a completed combustion event. Generally, the deeper the penetration of the flame 302 from the orifices 344 into the main combustion chamber 312, the quicker and more complete the burn of the fuel and air within the main combustion chamber. Increasing the velocity of the flame 302 exiting the orifices 344 into the combustion chamber 312 facilitates a deeper penetration of the flame 302. Moreover, the velocity of the flame 302 can be increased by decreasing the diameter of the orifices 344.

Figure 4:
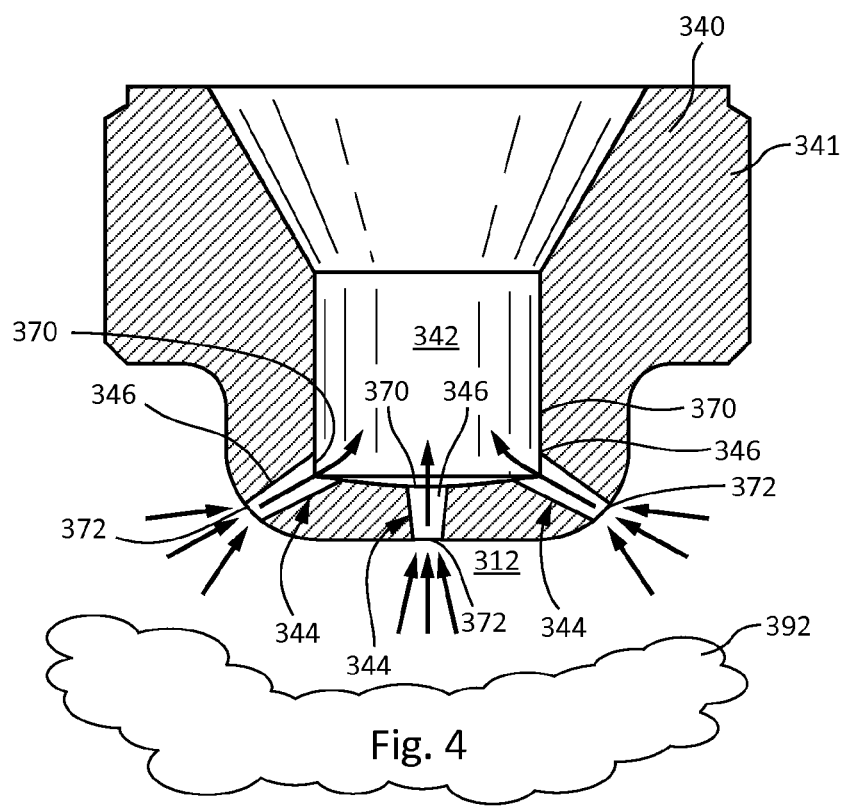
FIG. 4 is a cross-sectional side view of the pre-chamber apparatus of FIG. 3 showing residual combustion gases and/or a fuel and air mixture passing from the main combustion chamber to the combustion pre-chamber through the plurality of conically-shaped orifices.

However, for more efficient ignition of the flame 302 in the pre-chamber 342, larger orifice diameters generally are desirable to reduce the velocity of air and fuel mixtures from the main combustion chamber 312 into the combustion pre-chamber 342 through the orifices 344. The efficiency or responsiveness of the ignition of the flame 302 at the spark-generation site of the spark plug is largely dependent upon the velocity of the air and fuel mixture at the spark-generation site. The faster the velocity of the mixture, typically the less efficient the ignition of the flame 302. In one implementation, flow velocity at the spark-generation site should be somewhere between 5 msec to 15 msec to ensure a consistent ignition event. Referring to FIG. 4, during a compression stroke of the piston within the main combustion chamber 312 (following an intake stroke and the introduction of air and fuel into the main combustion chamber) the piston forces the air and fuel mixture in the main combustion chamber through the orifices 344 and into the pre-chamber 342 as indicated by directional arrows. The velocity of the mixture at the spark-generation site largely depends on the internal geometry of the pre-chamber itself. However, in certain cases, the velocity of the mixture at the spark-generation site also depends on the velocity of the mixture exiting the orifices 344 into the pre-chamber 342.

Such cases may include, but are not limited to, a pre-chamber configuration that does not create swirl motion with compound angle orifice holes. For cases where swirl motion is occurring inside a pre-chamber, the internal geometry of the pre-chamber may have a stronger effect on velocity at spark ignition site rather than velocity of the mixture exiting the orifices. The air and fuel mixture exits the orifices 344 into the pre-chamber 342 at a certain velocity that is dependent on the diameter of the orifices. Because the velocity of the mixture can be reduced by increasing a diameter of the orifices 344, increasing the diameter of the orifices 344 generally is desirable to effectuate a decrease in the velocity of the mixture at the spark-generation site within the pre-chamber 342.

Based on the foregoing, there are competing interests between decreasing the diameter of the orifices 344 to increase the velocity of the flame 302 into the main combustion chamber 312 and increasing the diameter of the orifices 344 to decrease the velocity of air and fuel mixture into the pre-chamber 342. The shape of the orifices 344 is configured to address and achieve both interests. More specifically, the diameter of the second open end 372 of the orifices 344 is relatively small, which facilitates a faster velocity of the flame 302 into the main combustion chamber 312, and diameter of the first open end 370 of the orifices is relatively large, which facilitates a slower velocity of fuel and air mixture 392 from the main chamber 312 into the pre-chamber 342 during a compression stroke. In this manner, the conically-shaped orifices 344 with differently sized open ends facilitate the dual purpose of improving combustion within the main chamber 312 and ignition within the pre-chamber.

The flow rate or velocity of the fuel and air mixture 392 of the main combustion chamber 312 into the combustion pre-chamber 342 can be further controlled by adding a smooth radius to the edges of the orifices at the second open end. For example, referring to FIG. 5, a pre-chamber apparatus 440 includes orifices 444 that each has a radiused fillet 480 (e.g., a smooth radiused edge) at the intersection or transition between the body 441 and the second open end 472. Because the orifices 444 are circular, the corresponding radiused fillets 480 each has a substantially annular shape. The radius or curvature of the radiused fillet 480 increases the discharge coefficient of the orifice 444, and thus the effective flow area of the orifice. The discharge coefficient is a ratio of the actual discharge from the orifice 444 to a theoretical discharge from the orifice (e.g., the ratio of the mass flow rate at the discharge end of the orifice to that of an ideal orifice which expands an identical working fluid from the same initial conditions to the same exit pressures). Generally, the higher the discharge coefficient, the higher the actual mass flow rate out of the orifice. Accordingly, the higher the discharge coefficient of the second open end 472 of the orifices 444, the higher the mass flow rate of flame from the pre-chamber 442 into the main combustion chamber 412. In this manner, the radiused fillets 480 of the orifices 444 act to increase the mass flow rate of the flame into the main combustion chamber 412, and thus increase the efficiency of the combustion event within the main combustion chamber. Additionally, conical shaped orifices with radiused edges can avoid potential flow separation issues during fluid transfer between the pre-chamber and main combustion chamber by reducing the pressure differential between the pre-chamber and main combustion chamber during a pre-chamber refill event, and increasing the pressure differential between the pre-chamber and main combustion chamber during a pre-chamber discharge or combustion event.

According to some implementations, the radius of the radiused fillet 480 is between about 0.0125 mm and about 0.5 mm. According to certain implementations, a ratio of the radius of the radiused fillet 480 and a diameter of the second open end 472 is between about 0.01 and about 0.2.

Figure 5:
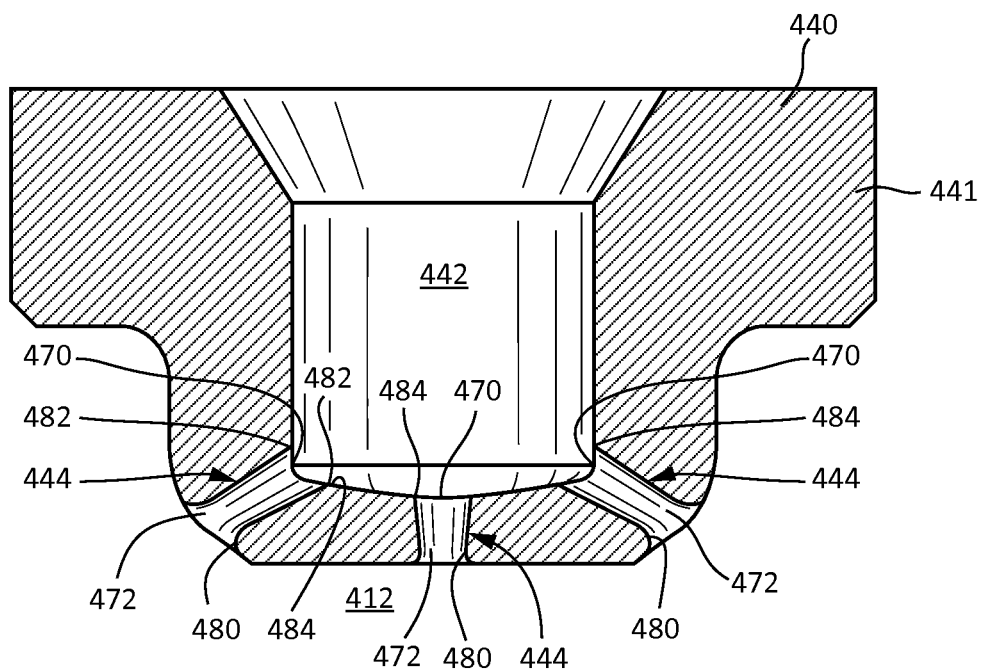
FIG. 5 is a cross-sectional side view of another embodiment of a pre-chamber apparatus with a plurality of conically-shaped orifices between a combustion pre-chamber and a main combustion chamber where the pre-chamber apparatus has respective radiused fillets about the intersections between the plurality of orifices and the main combustion chamber.
Figure 6:
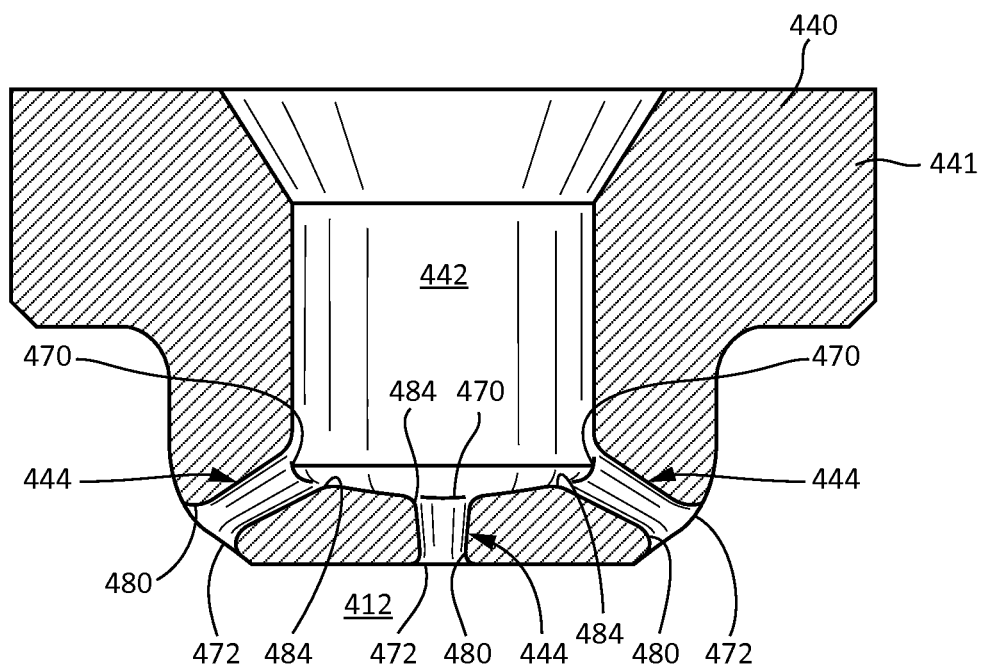
FIG. 6 is a cross-sectional side view of yet another embodiment of a pre-chamber apparatus with a plurality of conically-shaped orifices between a combustion pre-chamber and a main combustion chamber where the pre-chamber apparatus has respective radiused fillets about the intersections between the plurality of orifices and the combustion pre-chamber.

In certain implementations, the mass flow rate or velocity of the air fuel mixture into the pre-chamber 442 is desirably slow. Accordingly, in such implementations, the intersection or transition between the body 441 and the first open ends 470 of the orifices 444 have a sharp edge as shown in FIG. 5. The sharp edge at the first open ends 470 translates into a low discharge coefficient and a lower mass flow rate through the first open ends 470 into the pre-chamber 442. In other implementations, it may be desirable for the edge at the transition between the body 441 and the first open ends 470 of the orifices 444 to have a radiused fillet 484. The radius of the radiused fillet 484 can be any of various radii to achieve any of various discharge coefficients. In certain implementations, the radius of the radiused fillet 484 (and the associated discharge coefficient of the first open end 470) is smaller than the radius of the radiused fillet 480 (and the associated discharge coefficient of the second open end 472). According to some implementations, a ratio of a radius of the fillet 482 to a radius of the fillet 480 is between about 0.05 and about 0.85.

In this manner, the inclusion of radiused fillets to the open ends of the orifices provides an additional layer of precision or control to the flow rates and velocities through the orifices. In fact, in some implementations, the open ends of an orifice may have the same diameter but differently radiused fillets to increase the flow rate or velocity through the second open end (e.g., larger radius) compared to the flow rate or velocity through the first open end (no radius or smaller radius).

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A combustion pre-chamber apparatus for a main combustion chamber of an internal combustion engine, comprising:
   a body defining an internal combustion cavity;
   at least one orifice extending through the body, the at least one orifice comprising a first end open to the internal combustion cavity and a second end open to the main combustion chamber, wherein the first end is bigger than the second end;
   a sharp edge at the first end of the at least one orifice, the sharp edge structured to decrease a first discharge coefficient of the at least one orifice so as to decrease a mass flow rate of an air-fuel mixture into the internal combustion cavity; and
   a fillet at the second end of the at least one orifice, the fillet structured to increase a second discharge coefficient of the at least one orifice so as to increase a mass flow rate of an ignition flame into the main combustion chamber.

2. The combustion pre-chamber apparatus of claim 1, wherein the orifice has a conical-frustum shape.

3. The combustion pre-chamber apparatus of claim 1, wherein the orifice converges from the first end to the second end.

4. The combustion pre-chamber apparatus of claim 1, wherein the at least one orifice has a substantially circular cross-sectional shape.

5. The combustion pre-chamber apparatus of claim 1, wherein the at least one orifice comprises a plurality of orifices.

6. The combustion pre-chamber apparatus of claim 1, wherein the fillet has a radius, and wherein a ratio of the radius of the fillet and a diameter of the second end of the at least one orifice is between about 0.01 and about 0.2.

7. The combustion pre-chamber apparatus of claim 1, wherein a ratio of a cross-sectional area of the second end to a cross-sectional area of the first end is between about 0.5 and about 0.95.

8. The combustion pre-chamber apparatus of claim 1, wherein first discharge coefficient is different than the second discharge coefficient.

9. The combustion pre-chamber apparatus of claim 8, wherein the first discharge coefficient is smaller than the second discharge coefficient.

10. The combustion pre-chamber apparatus of claim 1, wherein a cross-sectional area of the at least one orifice decreases in a direction extending from the first end to the second end.

11. An internal combustion engine, comprising:
    a block defining a main combustion cylinder;
    a cylinder head coupled to the block above the main combustion cylinder, the cylinder head comprising a combustion pre-chamber, the cylinder head further comprising a plurality of orifices fluidly coupling the main combustion cylinder and the combustion pre-chamber, each of the plurality of orifices converging from a first end open to the combustion pre-chamber to a second end open to the main combustion cylinder;

a sharp edge at the first end of each of the plurality of orifices, the sharp edge structured to decrease a first discharge coefficient of each of the plurality of orifices so as to decrease a mass flow rate of an air-fuel mixture into the combustion pre-chamber;

a fillet at the second end of each of the plurality of orifices, the fillet structured to increase a second discharge coefficient of each of the plurality of orifices so as to increase a mass flow rate of an ignition flame into the main combustion chamber; and a spark plug at least partially positioned within the combustion pre-chamber.

12. The internal combustion engine of claim 11, further comprising a fuel and air mixture source in fluid communication with the main combustion cylinder, and a piston movable within the main combustion cylinder, wherein during a compression stroke of the piston a fuel and air mixture within the main combustion cylinder is driven into the combustion pre-chamber via the plurality of orifices.

13. The internal combustion engine of claim 11, further comprising a fuel injector in fuel injecting communication directly with the combustion pre-chamber.

14. An internal combustion engine, comprising:
a first combustion chamber;
a second combustion chamber;
a plurality of converging orifices, each of the plurality of converging orifices extending from a first end open to the first combustion chamber to a second end open to the second combustion chamber; and
a sharp edge at the first end of each of the plurality of converging orifices, the sharp edge structured to decrease a first discharge coefficient of each of the plurality of converging orifices so as to decrease a mass flow rate of an air-fuel mixture into the first combustion chamber; and
a fillet at the second end of each of the plurality of orifices, the fillet structured to increase a second discharge coefficient of each of the plurality of orifices so as to increase a mass flow rate of an ignition flame into the second combustion chamber.

* * * * *